Aug. 14, 1956 — A. J. SMITH, SR — 2,758,858
KNOT-TYING IMPLEMENT
Filed Nov. 30, 1954
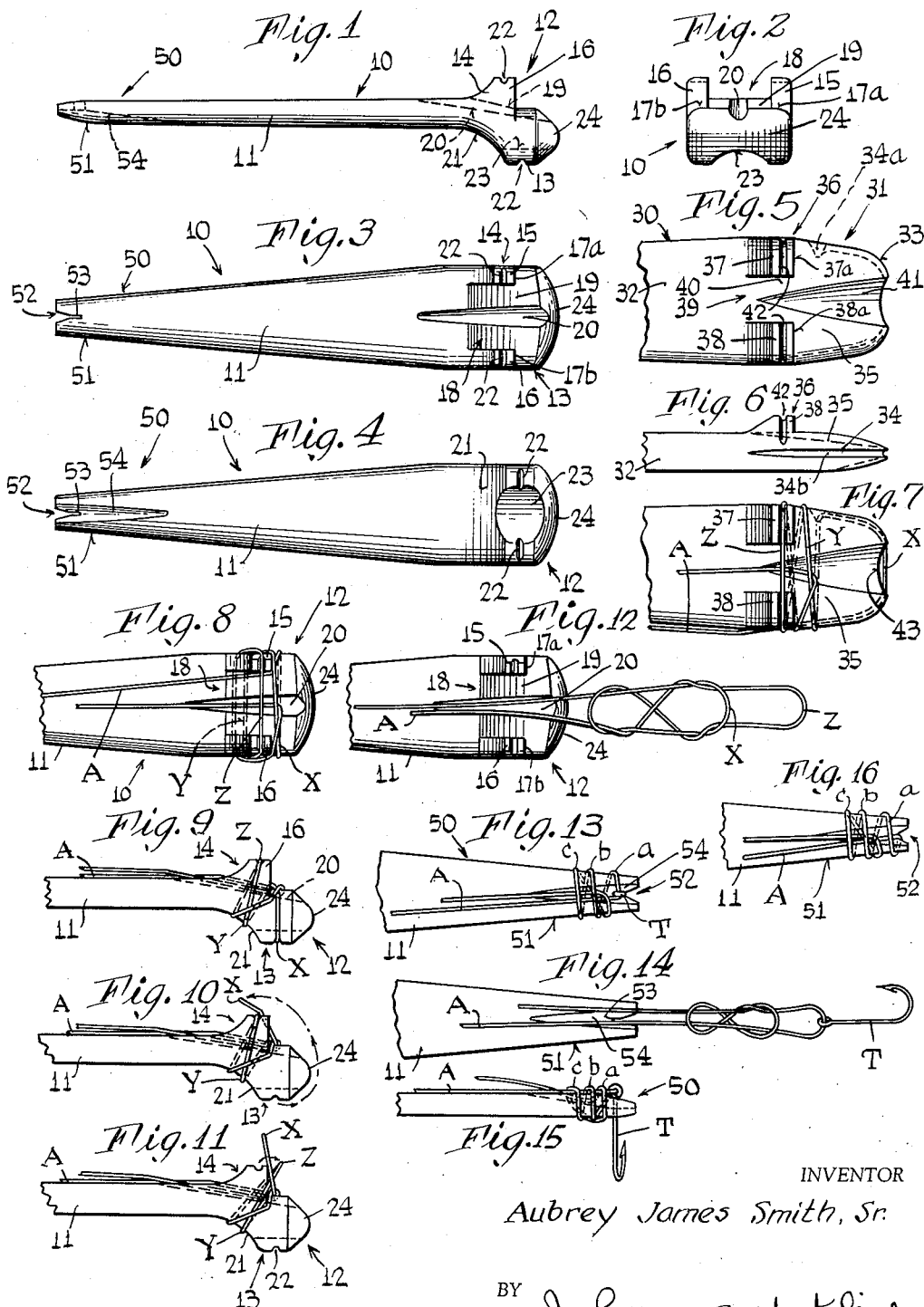
INVENTOR
Aubrey James Smith, Sr.
BY Johnson and Kline
ATTORNEYS

United States Patent Office 2,758,858
Patented Aug. 14, 1956

2,758,858

KNOT-TYING IMPLEMENT

Aubrey James Smith, Sr., Monroe, Conn.

Application November 30, 1954, Serial No. 471,960

6 Claims. (Cl. 289—17)

This invention relates to knot tying, and more particularly to implements for facilitating the tying of loop-forming knots in leaders.

The term "leader" is used herein for convenience of description, but it should be understood that the improvements of the present invention are not limited in use to any particular kind of cord, line, thread, filament, etc., and that therefore, the term "leader" as used herein is intended to include and embrace any and all of the above media.

An object of this invention is to provide a simple and efficient implement which may be held in the hand of the user to facilitate the handling of the end of a leader which is to be provided with a loop-forming knot, whereby the necessary turns or windings about the standing part of the leader may be easily made and manipulated to form a satisfactory knot.

The implement of the present invention is particularly advantageous and convenient when used in the tying of loop-forming knots in stiff, springy leaders—for instance, in monofilament leaders such as are used in fishing tackle. The implement includes, in addition to a handle portion by which it may be held, a winding mandrel about which the necessary or desired windings may be made with the free end of the leader held by and controlled by the fingers of one hand while the handle of the implement and the standing part of the leader are held by other hand and the fingers thereof.

An important feature of this invention, and one which is common to the several embodiments of the invention herein illustrated, is the provision in the winding mandrel of a channel extending inwardly from the outer end of the mandrel longitudinally of the implement to a position beyond the mandrel portion to guide the free end of the leader under the windings on the mandrel and beyond the same to a position where the free end may be easily grasped and manipulated.

In one embodiment of this invention, the implement may be used to form a slip-knot on a bight of the leader whereby the loop formed may be constricted and/or tightened on something (such as the eye of a fishhook) through which the free end of the leader was passed in the forming the loop. In this form of the invention, the winding mandrel may be plain and the end of the mandrel may have a V-notch to hold a fishhook wedged in it while the free end of the leader is passed through the eye. In case the slip loop or noose is to receive something after the knot is made, the loop may be formed by passing the free end of the leader around one of the legs of the V at the notched end before making the windings around the mandrel and the standing part of the leader.

In the embodiment of this invention intended to make loops of fixed size by non-slipping or clinched knots, the mandrel preferably has several axially and radially offset winding surfaces, preferably provided with circumferential leader retaining grooves so that the several turns to be taken about the standing part of the leader and the mandrel are separated for selective grasping by the fingers of the free hand of the user; and this operation is further facilitated by cutting out the mandrel under the winding-receiving portions to give finger clearance in manipulating the loops formed by the turns.

Although the improvements for tying noose-forming or slip-knots and that for forming a clinching knot may be incorporated in separate implements, by having them embodied in a single implement, one at each end of the handle, the utility of the implement is greatly enhanced.

Other features and advantages will hereinafter appear.

In the accompanying drawings:

Figure 1 is an elevational view of an implement according to the present invention having at each end means for facilitating a knot-tying operation.

Fig. 2 is an end view of Fig. 1 showing the knot-tying means at the right end of the tool.

Fig. 3 is a top plan view of Fig. 1.

Fig. 4 is a bottom plan view of Fig. 1.

Fig. 5 is a top view of a fragmentary end portion of the implement showing another form of a knot-tying means.

Fig. 6 is an elevational view of Fig. 5.

Fig. 7 is a view similar to Fig. 5 but showing the leader wound thereon in the relationship necessary to form a knot.

Fig. 8 is a top view based on Fig. 3 showing a right end portion of the implement and the knot-tying means with the leader wound thereon in proper relationship prior to forming the knot.

Fig. 9 is an elevational view of Fig. 8.

Figs. 10 and 11 are elevational views based on Figs. 8 and 9 showing procedural steps in the forming of the knot.

Fig. 12 is a plan view based on Fig. 8 showing the knot and loop formed in the leader in its untautened state after it has been carried through the procedural steps illustrated in Figs. 10 and 11.

Fig. 13 is a bottom plan view based on Fig. 4 showing a left end view of the implement with the knot-tying means having a fishhook threaded on the leader with the leader wound on the knot-tier preparatory to forming a slip-knot.

Fig. 14 is a view based on Fig. 13 showing a fishhook threaded on the leader with the knot thereon in its untautened state.

Fig. 15 is an elevational view similar to Fig. 13.

Fig. 16 shows the manner in which a noose may be formed with the knot-tying means shown in Fig. 13.

Referring now to the drawings, particularly to the form of the invention illustrated in Figs. 1–4 and 8–12, the implement 10 of the present invention may be made of a single piece of material such as metal, wood or plastic. Plastic is usually preferable because of its ease in manufacturing and its properties of not rusting, rotting or corroding when wet, these being important when the implement is primarily intended for use on or near the water.

The implement 10 has a handle portion 11 at the right end of which, as shown in Fig. 1, there is a knot-tying mandrel 12 having an end winding portion 13 and an inwardly spaced winding portion 14. The winding portions 13 and 14 are radially offset with respect to each other and the axis of the handle so as to be separate and distinct from each other. The inner winding portion 14 has a pair of spaced ears 15 and 16 having associated shoulders 17a and 17b extending beyond the handle 11 and the terminal winding surface 13. The space between the ears 14 and 15 forms a cutout 18, the bottom surface 19 of which is coextensive with a portion of the winding surface 13. There is provided in the bottom surface 19 and in the adjacent portion of the winding surface 13 a channel 20 which extends from the end of the mandrel into the handle portion 11 and at its inner end merges with the surface of the handle. Where the mandrel 12 joins with the handle, there is a curved surface 21 which blends into the handle.

In tying a loop-forming clinched knot shown in its unclinched state in Fig. 12, the handle 11 of the implement is held in one hand with the thumb and index fingers placed adjacent the projecting ears 15 and 16. The free end of the leader is held firmly by the thumb against the surface of the handle. As shown in Figs. 8 and 9, the free end is then placed in the cutout 18 adjacent the shoulder 17a of the ear 15 and the free end of the leader is wound around the terminal winding surface 13 and returned to the shoulder 17a to form a turn and then wound around the inner winding surface 14 over the curved surface 21 to form a turn Y and over the projecting ears 15 and 16 to form a turn Z longitudinally spaced from the turn X. In order to maintain the turns in longitudinally and transversely spaced relationship, the respective winding surfaces of the mandrel may be provided with leader-retaining notches 22 as shown. The free end of the leader is then brought around the curved surface 21 and against the shoulder 17b, after which the free end is inserted into the leader-guiding channel 20 and under the turns X and Y, and after being tautened against the shoulder 17b the free end is caught and held by the fingers of the hand holding the implement.

In order to form the loop-forming knot, the turn X is picked up as a loop by the fingers of the free hand from the leader notches 22 on the winding surafce 23 and moved in the direction of the arrows shown in Fig. 10 until it lies over the turn Z, whereupon the user's fingers are slipped through the loop Y and take hold of the loop Z. The loop Z is then pulled off the winding surface 12 and with it follows the knot, the end of the leader having the appearance shown in Fig. 12 ready to be adjusted and clinched. The adjustment of the size of the leader Z which is the terminal loop desired on the leader is made by pulling on the free end of the leader more or less until the desired size of loop is formed, whereupon by holding the loop Z in one hand and pulling on the standing part of the leader the knot is clinched so that no further pulling will extend the size of the loop Z. The free end of the leader beyond the knot may then be cut off if desired.

The form of implement shown in Figs. 1 to 4, having no surfaces or grooves which cannot be made with two-part dies, is particularly suitable when it is desired to make the implement of molded plastic material. If the making of the implement with two-part dies is of no consequence, the form of the implement may be made as shown in Figs. 5, 6 and 7, in which the implement 30 has a knot-tying means 31 and a handle portion 32. There is a mandrel 33 having a winding surface 34 extending longitudinally around the end of the mandrel, a circumferential winding surface 35, and an inner winding surface 36, the latter having a pair of ears 37 and 38 forming shoulders 37a and 37b and forming between them a passage or cutout 39. The bottom surface 40 of the passage 39 and the portion of the mandrel between the same and the end of the mandrel is provided with a channel 41, like the channel 20 in the form of the invention shown in Fig. 3. To make a loop-forming knot such as shown in Fig. 12 with the implement shown in Figs. 5 to 7, the standing part of the leader is led along the edge of the mandrel and guided into a groove 34b in the winding portion 34 to form the winding X, and the handle and the standing part of the leader are held in the fingers of one hand. The free end of the leader is carried around the end of the mandrel in the groove 34b and then onto the winding surface 35 through the notch 34a and one turn Y is taken about the winding surface 35 and another turn Z is taken about the winding surface 36, the leader being guided in the grooves 42 in the ears 37 and 38. The free end of the leader is then placed in the channel 41 and passed under the turns X and Y and pulled taut as shown in Fig. 7. The winding X is then taken from the winding surface 33 by the fingers of the free hand, the mandrel being cut out at 43 to facilitate this, and is carried as a loop up over the winding Z whereupon the fingers are slipped through the loop X and the winding Z is grasped as a loop and pulled through the loop X, this operation permitting the leader to slip off the implement and form the loop and knot the same as is shown in Fig. 12. As with the knot shown in Fig. 12, adjustment of the loop is effected by pulling on the free end of the leader and the knot is clinched by pulling on the standing part of the leader.

To form a slip-knot forming a loop or noose, the implement of the present invention may have on one end of the handle 11 a knot-tying means 50 comprising a plain surface mandrel 51, the end of which has a V-notch 52 including a slot 53. From the end of the mandrel and extending inwardly there is a leader-guiding channel 54, like the leader-guiding channels 20 in the form of the invention shown in Fig. 1 and 41 in the form of the invention shown in Fig. 5. Assuming that the slip-knot is to close down as a noose on some other article through which the leader passes, such as the eye of a fishhook, the fishhook T, as shown in Figs. 13 to 15, is wedged in the slot 53 and the standing part of the leader and the handle 11 are held by the fingers of one hand. The free end of the leader is then passed through the eye of the fishhook and turns a, b and c are taken around the mandrel, after which the free end is passed through the channel 54 under the turns b and c, whereupon the hook and the knot are slipped off the end of the mandrel, the latter being preferably tapered to facilitate this, and the knot may then be tightened by pulling on the free end of the leader. The loop formed by the partial turn a may then be shortened until the knot is brought tightly against the eye of the hook.

In the event that it is desired to form, by the implement shown in Figs. 13 and 14, a loop into which something may later be inserted, the loop is formed by causing the free end of the leader where it joins the standing part to pass in and out of the bifurcated end of the mandrel as shown in Fig. 16. The knot being otherwise formed as was described in connection with Figs. 13 to 15, when it is taken from the mandrel the loop is removed first and then the knot is slipped off the mandrel, the knot being tightened by pulling on the free end of the leader, and the size of the loop being adjusted by pulling on the standing part of the leader.

Variations and modifications may be made within the scope of the claims and portions of the improvements may be used without others.

I claim:

1. A hand implement for tying a knot in a strand of fishing line leader comprising an elongate handle and a winding mandrel at one end of the handle to receive and hold spaced windings formed of the portion of the leader between the free end and the standing part thereof and surrounding the latter, said mandrel having in one side a channel extending inwardly from the outer end of the mandrel longitudinally along the mandrel to receive and guide the free end of the leader under said spaced windings on the mandrel toward the handle, the channel extending inwardly beyond the mandrel into the adjacent portion of the handle and having its bottom meeting the surface of the handle to guide the free end of the leader to position to be easily grasped and manipulated, said mandrel having axially spaced winding receiving portions, at least one of which projects radially beyond the others and being circumferentially grooved to hold the winding thereon against casual displacement, said projecting portion being notched parallel to the axis of the mandrel to provide finger clearance to facilitate the manipulation of the winding thereon.

2. An implement as defined in claim 1 in which the mandrel is provided with side grooves extending axially to and around the end thereof to receive and hold a winding lying at right angles to the circumferential windings on the mandrel, the grooved end portions of the mandrel having a transverse notch to provide finger clearance to facilitate the manipulation of the winding thereon.

3. An implement as defined in claim 1 in which a second winding receiving portion of the mandrel also is circumferentially grooved to hold its winding thereon against casual displacement and is transversely notched to provide finger clearance to facilitate the manipulation of winding thereon.

4. An implement as defined in claim 3 in which said second winding receiving portion is located adjacent the outer end of the mandrel so that a loop formed by the winding thereon can be removed therefrom and carried around the end of the mandrel to lie over and receive within it the winding on the other said winding portion.

5. A hand implement for tying a knot in a strand of fishing line leader comprising an elongate handle and a winding mandrel at one end of the handle to receive and hold spaced windings formed on the portion of the leader between the free end and the standing part thereof and surrounding the latter, said mandrel having in one side a channel extending inwardly from the outer end of the mandrel longitudinally along the mandrel to receive and guide the free end of the leader under said spaced windings on the mandrel toward the handle, the channel extending inwardly beyond the mandrel into the adjacent portion of the handle and having its bottom meeting the surface of the handle to guide the free end of the leader to position to be easily grasped and manipulated, the other end of the mandrel having a V-notch into which may be wedged to be there held a member having an eye portion through which the free end of the leader may be passed before the free end is wound on the mandrel over the standing part of the leader.

6. A hand implement for tying a knot in a strand of fishing line leader comprising an elongate handle and a winding mandrel at the end of the handle to receive and hold spaced windings formed of the portion of the leader between the free end and the standing part thereof and surrounding the latter, said mandrel having in one side a channel extending inwardly from the outer end of the mandrel longitudinally along the mandrel to receive and guide the free end of the leader under said spaced windings on the mandrel toward the handle, the channel extending inwardly beyond the mandrel into the adjacent portion of the handle and having its bottom meeting the surface of the handle to guide the free end of the leader to position to be easily grasped and manipulated, said mandrel having axially and radially offset spaced portions around which the standing part of the leader and the free end thereof is wound, said portions having finger clearance notches whereby an outer winding may be carried by the fingers as a loop over the end of the mandrel and over an inner loop and the latter may be picked up and carried by the fingers through the outer loop to form a terminal loop on the leader secured by a knot which is self-clinching under strain applied by the standing part.

References Cited in the file of this patent

UNITED STATES PATENTS

| 2,601,605 | Fulvio | June 24, 1952 |
| 2,689,147 | Smalley | Sept. 14, 1954 |